United States Patent [19]

Gourlaouen et al.

[11] Patent Number: 4,999,180

[45] Date of Patent: Mar. 12, 1991

[54] NEODYMIUM HYDROXYNITRATE

[75] Inventors: Claire Gourlaouen; Claude Magnier, both of Paris; Bertrand Latourrette, Le Raincy; Anne Tugaye, Bougival; Francoise Deneuve, Paris, all of France

[73] Assignee: Rhone-Poulenc Specialties Chimiques, Courbevoie, France

[21] Appl. No.: 884,633

[22] Filed: Jul. 11, 1986

[30] Foreign Application Priority Data

Jul. 11, 1985 [FR] France ............................... 85/10616

[51] Int. Cl.$^5$ ........................ C01F 17/00; C01G 1/02; C01G 57/00
[52] U.S. Cl. .................................... 423/592; 423/21.1
[58] Field of Search ..................... 423/21.1, 21.5, 592; 75/108, 121

[56] References Cited

PUBLICATIONS

Louer, D.; Deneuve, F.; Herviou, C.; Gourlaouen, C., "Powder Diffraction of Neodymium Hydroxynitrate Nd (OH)$_2$(NO$_3$).H$_2$O", Powder Diffr., 1986, 1(3), 263–264, abstracted in Chemi. Abs. vol. 105: 216983g, 1986.
Mellor, J. W., "A Comprehensive Treatise on Inorganic and Theoretical Chemistry", vol. 5, 1946, pp. 625–637 and 668–674.
Chem. Abstracts, vol. 81, 1974, p. 601, No. 71972b.
Chem. Abstracts, vol. 102, No. 18, May, 1985, p. 125, No. 151527c.
Chem. Abstracts, vol. 103, No. 4, Juillet 1985, p. 110, No. 24447x.
Inorganic Chemistry, vol. 13, No. 8, 1974, pp. 1812–1818.
Chem. Abstracts, vol. 74, 1971, p. 470, No. 60296p.
Chem. Abstracts, vol. 68, 1968, p. 2251, No. 23193h.
Chem. Abstracts, vol. 74, No. 8, 1971, p. 470, No. 37837g.

Primary Examiner—Gary P. Straub
Assistant Examiner—Steven Bos
Attorney, Agent, or Firm—Burns, Doane, Swecker & Mathis

[57] ABSTRACT

A neodymium hydroxynitrate, readily calcined into, e.g., neodymium oxide, Nd$_2$O$_3$, has the formula (I):

$$Nd(OH)_2NO_3.1H_2O \qquad (I)$$

26 Claims, 2 Drawing Sheets

|← 10 μm →|

|←— 10μm —→|

NEODYMIUM HYDROXYNITRATE

BACKGROUND OF THE INVENTION

Field of the Invention

The present invention relates to a novel neodymium compound and, more especially, to a novel neodymium hydroxynitrate. This invention also relates to a process for the preparation of the subject neodymium hydroxynitrate, and to industrial applications thereof.

BRIEF DESCRIPTION OF THE DRAWINGS

For a full understanding of the invention, the following summary of the invention and detailed description should be read in conjunction with the drawings, wherein.

SUMMARY OF THE INVENTION

A major object of the present invention is the provision of a novel neodymium hydroxynitrate having the following formula (I):

$$Nd(OH)_2NO_3 . 1H_2O \qquad (I)$$

The neodymium hydroxynitrate according to this invention has the following characteristics:

(a) Morphology

Figure 1:
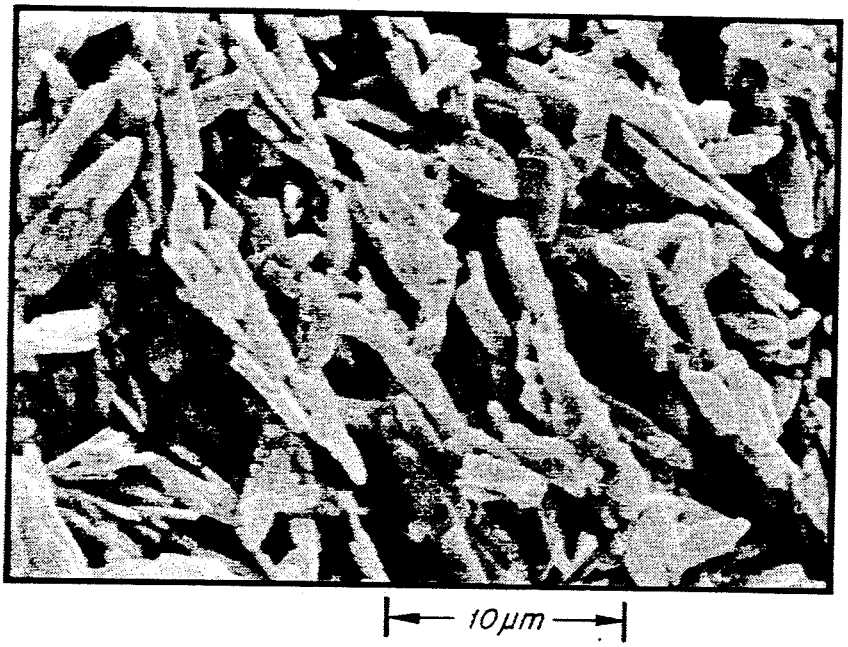
FIG. 1 as a photomicrograph of $Nd(OH)_2NO_3 \cdot 1H_2O$.

The morphologic appearance of the title compound is as shown in FIG. 1, a scanning electron micrograph (G=3000).

The subject neodymium hydroxynitrate is present in the form of small rods having dimensions ranging from 2 to 20 μm.

(b) Crystalline structure

It is determined by X-ray diffraction.

Neodymium hydroxynitrate is a well crystallized material; its degree of crystallization is high and ranges from 70 to 100%.

Its X-ray spectrum obtained with respect to monochromatic copper radiation (Kα Cuλ=1.5418 Å) is as follows:

| Bragg angle 2θ observed | Planar distance d (Å) | Relative intensity I/Io |
|---|---|---|
| 20.88 | 4.251 | 51 |
| 25.74 | 3.458 | 30 |
| 28.53 | 3.126 | 88 |
| 29.00 | 3.076 | 100 |
| 31.04 | 2.879 | 47 |
| 49.56 | 1.837 | 38 |

The crystalline lattice displays monoclinic symmetry and has the following parameters:
$a = 19.3814 \pm 42 Å$
$b = 3.8841 \pm 11 Å$
$c = 6.2914 \pm 12 Å$
$\alpha = \gamma = 90°$
$\beta = 96.428 \pm 16°$
$V = 470.63 Å^3$ The size of the elemental crystallites is determined by electronic transmission microscopy; it ranges from 50 to 2000 Å.

(c) Chemical composition

It corresponds to the chemical formula given above. This is confirmed qualitatively:

(i) By infrared spectrophotometry

Figure 2:
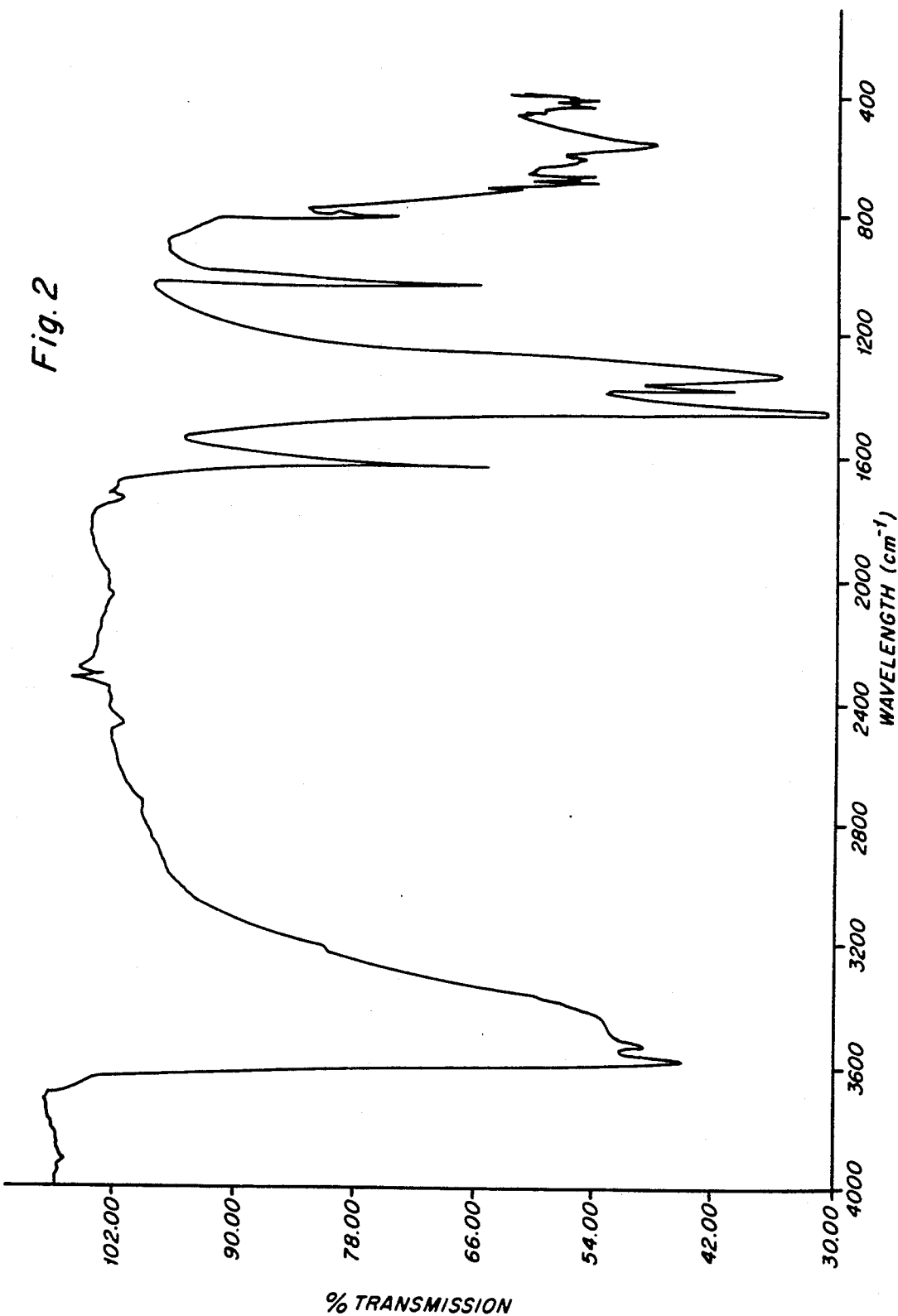
FIG. 2 is an infrared spectrum of $Nd(OH)_2NO_3 \cdot 1H_2O$ obtained by incorporation in KBr.

FIG. 2 shows the spectrum obtained by incorporation in KBr. The characteristic peaks are:

$OH^-$ bands = 3550 cm$^{-1}$ and 3530 cm$^{-1}$ $NO_3^-$ bands = 1660 cm$^{-1}$, 1460 cm$^{-1}$, 1330 cm$^{-1}$ and 614 cm$^{-1}$.

(ii) By differential thermal analysis

The compound is calcined under a controlled atmosphere of dry air with a temperature rise of 300° C. per hour. The results obtained are as follows:

110° C.: endothermal peak corresponding to a loss of $H_2O$

190° C.: endothermal peak corresponding to a loss of $H_2O$

380° C.: endothermal peak corresponding to a loss of $H_2O + NO_x$

520° C.: endothermal peak corresponding to a loss of $NO_x$

The chemical composition of the compound of the invention has also been confirmed quantitatively:

(i) By chemical analysis (1) The neodymium is titrated in a sample (100 to 150 mg) dissolved in a few drops of 4 N nitric acid, then diluted in an acetic buffer (pH=5.8), by EDTA determination in the presence of xylenol orange;

(2) The $OH^-$ group is determined in a sample of approximately 100 mg dissolved in 20 cm$^3$ 0.1 N hydrochloric acid, with the aid of a 0.1 N sodium hydroxide solution (3) The $NO^-_3$ group is reduced by means of a Devarda reducing agent, then determined by acidimetry after evaporation to dryness.

The elemental analysis expressed in % by weight is as follows, the water content being determined by subtraction:

| | $Nd^{3+}$ | $OH^-$ | $NO^-_3$ | $H_2O$ |
|---|---|---|---|---|
| % | 56.9 ± 1 | 14.4 ± 1 | 22.4 ± 5 | 6.2 ± 3 | which corresponds to the following calculated formula:

$$Nd(OH)_{2.1 \pm 0.1}(NO_3)_{0.9 \pm 0.1} . 0.9 \pm 0.1 \, H_2O$$

(ii) By thermogravimetry

The results obtained are reported in the following table:

| | |
|---|---|
| 25/150° C. | −2.1% |
| 150/230° C. | −7.2% |
| 230/280° C. | −15.9% |
| 480/630° C. | −9.9% |
| 630/1000° C. | −5.4% |
| ΔP 1000° C. | −40.6% |

The aforesaid neodymium compound (I) is advantageously prepared by the following process, which circumscribes another object of the invention.

Briefly, this process for the preparation of neodymium hydroxynitrate of the formula (I) comprises:

(i) reacting an aqueous solution of neodymium nitrate with a base under conditions such that the concentration of the neodymium nitrate solution, expressed as the cation $Nd^{3+}$, is at least 1 mole/liter, and that the molar ratio between the $OH^-$ ion concentration of the base and the concentration of the neodymium nitrate solution, expressed as the cation $Nd^{3+}$, is less than or equal to 2.2;

(ii) separating the precipitate thus formed; and
(iii) drying said precipitate.

DETAILED DESCRIPTION OF THE PREFERRED EMBODIMENTS OF THE INVENTION

More particularly according to the present invention, in the first stage of the aforedescribed process, the aqueous neodymium nitrate solution is admixed with the base.

Consistent herewith, the neodymium nitrate is used in either the anhydrous form, or in the hydrated state, $Nd(NO_3)_3 \cdot 6 H_2O$.

The purity of the neodymium salt is selected as a function of the intended application thereof.

The concentration of the neodymium nitrate solution according to the invention is at least 1 mole/liter in $Nd^{3+}$. Preferably, it ranges from 1 to 6 moles/liter.

The acidity of said solution is not critical according to the invention.

The base reactant used in the process of the invention is typically in the form of an aqueous solution. Aqueous solutions of bases such as ammonia, sodium hydroxide, potassium hydroxide, ammonium carbamate, urea, hexamethylenetetraamine, or the like, are advantageously used.

Gaseous ammonia may also be used.

According to this invention, an aqueous ammonia solution is the preferred base.

The normality of the basic solution is not critical according to the invention. It may vary over wide limits, for example, from 0.1 to 11 N, but preferably a solution having a concentration of from 2 to 11 N is used.

The proportion of the basic solution to the neodymium nitrate solution is advantageously such that the molar ratio $[OH^-]/[Nd^{3+}]$ is greater than 0.1 and less than or equal to 2.2.

In a preferred embodiment of the invention, a concentration of the neodymium nitrate solution is selected expressed as $Nd^{3+}$, of from 1 to 3 moles/liter as is a molar ratio $[OH^-]/[Nd^{3+}]$ of from 1 to 2.0.

The admixture of the aforementioned reagents may be carried out in any one of a number of variations. For example, the mixture of the aqueous solution of neodymium nitrate and the basic solution may be effected simultaneously under agitation, or the base may be added continuously, or in a single batch, to the neodymium nitrate solution, or conversely.

The flow rates of the addition of the solutions of the reagents are adjusted such that the aforenoted ratio of $[OH^-]/[Nd^{3+}]$ is attained.

It is also possible to control the flow rates by regulating the pH, which most frequently ranges from 7.0 to 8.0.

The temperature of the reaction medium preferably ranges from 10° to 50° C. and more particularly from 10° to 30° C.

The dwell time of the mixture in the reaction medium may vary over wide limits, from at least 0.1 second to several hours, for example, 48 hours or more. A dwell time of 5 min to 30 min is generally satisfactory.

The conditions of agitation should be relatively vigorous. The speed of the agitation depends upon the type of agitator and the ratio of the diameter of the agitator to that of the reactor. As an example, the speed of a four-blade agitator, which rotates very close to the walls of a reactor having a 15 cm diameter (useful volume = 750 cm$^3$) is set at 100 to 1000 rpm.

The second stage of the process of the invention comprises separating the precipitate which results, which precipitate is in suspension in the reaction mass.

The precipitate may be separated from the reaction medium by conventional techniques for liquid/solid separation, in particular by filtration or centrifugation, which is preferred for short retention or dwell times. The separation is typically carried out at ambient temperature, most frequently from 15° to 25° C.

The centrifuged precipitate, or the filter cake, may be subjected to washing in order to eliminate the anions adsorbed thereon.

The washing is preferably carried out using distilled or permutated water, the temperature of which may vary from 5° to 90° C. One or several washes are carried out, most often one to three.

Washing may also be carried out using an organic solvent. Aliphatic, cycloaliphatic or aromatic hydrocarbons, or aliphatic or cycloaliphatic alcohols, such as methanol, ethanol, n-propanol, isopropanol, n-butanol, isobutanol, neobutanol, are representative of the wash solvents.

One or several washings, most frequently one to three washes, are carried out.

After washing, the water content of the cake ranges from 20 to 80% and generally from 20 to 50%.

The precipitate obtained after separation and the optional washes is then subjected to a drying stage.

Drying may be carried out in air, or under a reduced pressure on the order of $10^{-2}$ to 100 mm mercury (1.33 to $1.33 \times 10^4$ Pa).

The drying temperature may range from ambient to 200° C.

The duration of drying is a function of temperature: it is not critical and may range from 30 min to 48 hr, but preferably ranges from 2 hr to 8 hr.

The process of the invention may be carried out in conventional apparatus. The stage of the mixing of the solutions of the reagents is effected in a reactor equipped with suitable heating means, for example, by hot water circulation in the double jacket of the reactor, or by means of heat exchangers (coils) The reactor must also be equipped with the usual temperature control devices (thermometers) and agitators (blade, anchor, screw or turbine agitator), together with a device for the introduction of one or two reagents in the form of an aqueous solution, for example, a metering pump.

The apparatus to be used for carrying out the separation and drying operations does not require any particular characteristics.

The suspension obtained may be filtered on a filter under the pressure of an inert gas, such as nitrogen, a vacuum filter (Buchner, Nutche) or on a continuous filtering device, such as, for example, a Vernay type rotating filter or a belt filter.

The precipitate is placed into silica, porcelain or alumina boats and subjected to the drying operation, which may be carried out in a drying apparatus, for example, in a ventilated or vacuum oven, or in a desiccator under reduced pressure assured by a glass filter pump.

According to the invention, a neodymium hydroxynitrate is obtained which may be used as an industrial intermediate, in particular, for the production of neodymium oxides or carbonates.

One notable use of the compound of the invention is in the preparation of neodymium oxides by calcination of the neodymium hydroxynitrate having the formula (I).

The neodymium hydroxynitrate of the formula (I), in the dry state, is subjected to calcination at a temperature of from approximately 650° to 1300° C.

The duration of the calcination is not critical and most frequently ranges from 1 hr to 4 hr.

A neodymium oxide having a specific surface, after calcination at temperatures of from 700° to 900° C., of from 5 to 30 m$^2$/g is produced. The specific surface is defined as the B.E.T. specific surface, determined by the method of BRUNAUER, EMMETT, TELLER, as described in *J.A.C.S.*, 60, 309 (1938).

In order to further illustrate the present invention and the advantages thereof, the following specific examples are given, it being understood that same are intended only as illustrative and in nowise limitative.

EXAMPLE 1

Into a two liter reactor having a double jacket in which water was circulating and maintained at 20° C., equipped with a thermometer, a system for the introduction of reagents, and an agitator (four-blade agitator), the following materials were simultaneously introduced, at the respective flow rates of 800 cm$^3$/hr and 1000 cm$^3$/hr:

(i) an aqueous solution of neodymium nitrate, containing 1.3 moles/liter of Nd$^{3+}$; and (ii) an aqueous 5.4 N ammonia solution with the OH$^-$/Nd$^{3+}$ ratio equal to 1.51.

The temperature of the reaction medium was 20° C.

The dwell time of the mixture in the reaction medium was 20 min.

The velocity of agitation was 450 rpm.

After 20 min, the reaction mass was filtered at ambient temperature on a Buchner filter.

The amount of neodymium remaining in the mother liquor was determined by complexation with a titer solution of the sodium salt of ethylenediamine tetraacetic acid, enabling the determination of a precipitation yield of 75%.

The precipitate obtained was then dried in an oven at 50° C. for 2 hr.

A neodymium hydroxynitrate having the formula Nd(OH)$_2$NO$_3$ . 1 H$_2$O was produced.

X-ray analysis evidenced that the product was well crystallized, with its degree of crystallization being about 90%.

The IR and X-ray spectra, the differential thermal and thermogravimetric analyses were those set forth hereinbefore.

EXAMPLE 2

The procedure of Example 1 was repeated, but the concentration of the neodymium nitrate solution was modified to 2.4 moles/liter of Nd$^{3+}$, the concentration of the ammonia solution was 10.5 N and the respective flow rates were 1400 cm$^3$/hr and 900 cm$^3$/hr, with the molar ratio OH$^-$/Nd$^{3+}$ being equal to 2.2.

A compound corresponding to the formula Nd(OH)$_2$NO$_3$ . 1 H$_2$O and having the aforedescribed morphological and crystalline structural properties, was produced.

EXAMPLE 3

10 g of the compound prepared in Example 1 were sampled.

This material was deposited into a boat, which was placed in a tubular furnace. The temperature was raised at a rate of 9° C. per minute to 700° C., which was maintained for 1 hr. Cooling was permitted at the inertial rate of the furnace.

5.5 g of a calcined product having the formula Nd$_2$O$_3$ (ASTM 21-579) and a BET specific surface, after calcination at 700° C., of 22 m$^2$/g were produced.

While the invention has been described in terms of various preferred embodiments, the skilled artisan will appreciate that various modifications, substitutions, omissions, and changes may be made without departing from the spirit thereof Accordingly, it is intended that the scope of the present invention be limited solely by the scope of the following claims, including equivalents thereof.

What is claimed is:

1. A compound having the formula (I):

$$Nd(OH)_2NO_3 . 1H_2O \qquad (I)$$

2. The compound as defined by claim 1, in the form of small rods ranging in size from 2 to 20 μm.

3. The compound as defined by claim 1, having a degree of crystallinity ranging from 70 to 100%.

4. The compound as defined by claim 3, the elementary crystallites of which ranging in size from 50 to 2000 Å.

5. The compound as defined by claim 1, having an elemental analysis of 56.9±1% Nd$^{3+}$, 14.4±1% OH$^-$, 22.4±5% NO$_3^-$ and 6.2±3% H$_2$O.

6. A process for the preparation of the compound as defined by claim 1, comprising (i) reacting an aqueous solution of neodymium nitrate with a base, thereby forming a mixture in a reaction medium wherein the concentration of neodymium nitrate, expressed as Nd$^{3+}$, is at least one mole/liter and the molar ratio of the OH$^-$ ions of the base to the concentration of the neodymium nitrate, also expressed as Nd$^{3+}$, is less than or equal to 2.2, (ii) separating the neodymium hydroxynitrate precipitate thus formed, and (iii) drying said neodymium hydroxynitrate precipitate.

7. The process as defined by claim 6, wherein the concentration of said neodymium nitrate solution ranges from 1 to 6 moles/liter.

8. The process as defined by claim 6, said base comprising liquid ammonia, sodium hydroxide, potassium hydroxide, ammonium carbamate, urea, hexamethylenetetramine or gaseous ammonia.

9. The process as defined by claim 6, said base comprising an aqueous solution, the normality of which ranging from 0.1 to 11 N.

10. The process as defined by claim 9, the normality of the basic solution ranging from 2 to 11 N.

11. The process as defined by claim 6, wherein the molar ratio [OH$^-$]/[Nd$^{3+}$] is greater than 0.1 and less than or equal to 2.2.

12. The process as defined by claim 11, wherein the [OH$^-$]/[Nd$^{3+}$] ratio ranges from 1 to 2.0 and the concentration of the neodymium nitrate solution, expressed as Nd$^{3+}$, ranges from 1 to 3 moles/liter.

13. The process as defined by claim 6, wherein the temperature of the reaction medium ranges from 10° to 50° C.

14. The process as defined by claim 6, wherein the residence time of the mixture in the reaction medium ranges from 0.1 sec to 48 hr.

15. The process as defined by claim 6, wherein the precipitate is separated by filtration or centrifugation.

16. The process as defined by claim 6, wherein said reacting step includes one of (a) simultaneous mixing of the aqueous solution and the base under agitation, (b) adding the base continuously or batch-wise to the aqueous solution and (c) adding the aqueous solution continuously or batch-wise to the base.

17. The process as defined by claim 6, wherein the molar ratio is attained by adjusting the rate of addition of the base and the aqueous solution to the reaction medium.

18. The process as defined by claim 6, wherein the flow rates of said base and said aqueous solution to the reaction medium is controlled by regulating the pH of the reaction medium to between 7.0 and 8.0.

19. The process as defined by claim 6, wherein the temperature of the reaction medium ranges from 10° C. to 30° C.

20. The process as defined by claim 6, wherein the reaction mixture is agitated with an agitator revolving at a speed of from 100 to 1000 rpm.

21. The process as defined by claim 6, including the step of washing the precipitate prior to the drying step, said washing being effected with one or several washes with water or an organic solvent.

22. The process as defined by claim 6, wherein the drying step is effected at a temperature of from ambient to 200° C.

23. The process as defined by claim 6, wherein the length of the drying step is between 30 minutes and 48 hours.

24. The process as defined by claim 6, wherein the length of the drying step is between 2 hours and 8 hours.

25. The compound as defined by claim 1, wherein the compound obtained with respect to monochromatic copper radiation ($K\alpha$ $Cu\lambda = 1.5418 Å$) as follows.

26. The compound as defined by claim 1, wherein the compound has characteristic peaks under infrared spectrophotometry as follows: $OH^-$ bonds = 3550 cm$^{-1}$ and 3530 cm$^{-1}$ $NO_3^-$ bonds = 1660 cm$^{-1}$, 1460 cm$^{-1}$, 1330 cm$^{-1}$ and 614 cm$^{-1}$.

* * * * *